United States Patent Office 3,408,413
Patented Oct. 29, 1968

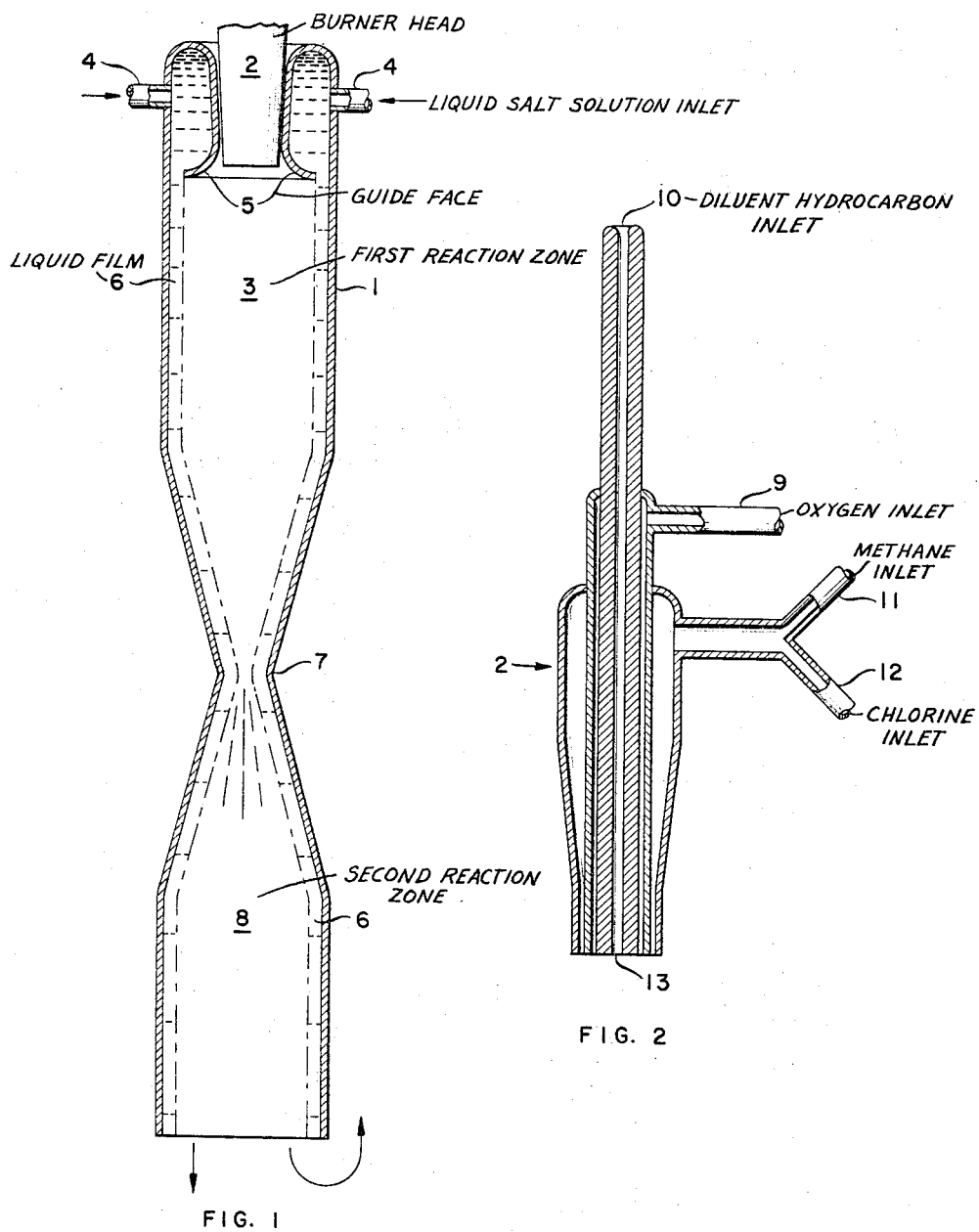

3,408,413
PROCESS FOR THE PREPARATION OF
ACETYLENE AND VINYL CHLORIDE
Willem P. Hendal and Albertus J. Mulder, Amsterdam,
Netherlands, assignors to Shell Oil Company, New
York, N.Y., a corporation of Delaware
Filed July 8, 1965, Ser. No. 471,479
Claims priority, application Netherlands, July 16, 1964,
6408161
7 Claims. (Cl. 260—656)

This invention relates to a process for the preparation of acetylene and vinyl chloride from methane and chlorine by flame reaction.

A similar process is shown in British Patent 842,539 wherein the starting gaseous mixture is introduced into a combustion chamber in which the flame reaction takes place at a temperature above 700° C. In this reaction large quantities of hydrogen chloride, soot and tarry products are formed. The formation of hydrogen chloride is undesirable due to its corrosive properties. In addition, a part of the chlorine is converted into the cheaper hydrogen chloride thus making the cost of the desired products high and the process economically undesirable. The formation of soot and tarry products is also detrimental due to the loss of carbon from the reactant thereby lowering the yield of desired products. Moreover, the reactor is adversely affected due to plugging and influence on flow or heat insulation caused from deposition of soot and tars on the reactor wall.

The above-mentioned British Patent proposes to minimize these harmful effects in various ways. Thus, it is recommended that hydrocarbons with a low hydrogen content be employed as a starting material in order to minimize the formation of hydrogen chloride. The addition of additional hydrogen chloride is also proposed, however, in order to promote the conversion of acetylene into vinyl chloride. It is suggested that the formation of soot be reduced by cooling the gases formed, for example, by injection of water. High gas feed rates, addition of inert gases or selectively reactive gases and external cooling of the combustion chamber are expedients recommended for the stabilization of the flame and for influencing the nature and quantity of the products formed.

While the above measures present some advantages they do not remove the major drawbacks including corrosion of the reactor and the deposition of soot and tarry products on the reactor walls.

U.S. Patent 3,176,047, dated Mar. 30, 1965, to Braconier et al., proposes a process for the preparation of unsaturated hydrocarbons by pyrolysis of saturated hydrocarbons wherein steam is injected into the reaction zone and condensed when it comes in contact with externally cooled walls of the reactor thereby forming a coating of water around the reactor walls which allegedly minimizes soot and tarry by-product deposition. This process is inherently unsatisfactory, however, for the preparation of mixtures of acetylene and vinyl chloride since the hydrogen chloride formed in such a process would be absorbed by the aqueous film on the reactor walls and cause severe corrosion problems.

It is an object of the present invention to provide an improved process for the flame reaction of methane and chlorine to form acetylene and vinyl chloride wherein the proportions of acetylene and vinyl chloride relative to each other in the reaction product can be varied and the quantity of hydrogen chloride produced greatly reduced.

It is also an object of the present invention to provide a process for the preparation of acetylene and vinyl chloride wherein the formation of soot and tarry by-products on the reactor walls and corrosion of the reactor due to content of the reactor with hydrogen chloride is substantially eliminated.

Other objects and advantages of the invention will become apparent from the following description of the invention made with reference to the accompanying drawing, wherein: FIG. 1 represents a sectional view of a reactor suitable to carry out the present process and FIG. 2 shows a sectional view of an exemplary burner head adapted for use in the reactor of FIG. 1.

It has now been found that acetylene and vinyl chloride can be formed in a two-step reaction process which substantially eliminates the deposition of soot and tarry by-products on the reactor walls and also subsantially eliminates reactor corrosion by both reducing the hydrogen chloride content and preventing contact of hydrogen chloride with the reactor walls. In accordance with the present invention methane and chlorine are fed into a first upright elongated reaction zone in which is maintained a stabilizing flame of oxygen and hydrocarbon gas (e.g., methane). The inner walls of the first reaction zone are constantly wetted by flowing a liquid downwardly over them in which hydrogen chloride is substantially insoluble. The methane and chlorine react by combustion in the flame in the first reaction zone and are then passed into an upright second reaction zone. A constriction or narrowing of the reactor separates the two reaction zones and as the reaction gases are passed from the first reaction zone along with the flowing liquid through the constriction a portion of the liquid is atomized thereby extinguishing the flame from the first reaction zone and cooling the gases. The unatomized portion of the liquid from the first reaction zone forms a continuous layer on the inner walls of the second reaction zone. Further reaction of the reaction gases passing through the constriction takes place in the second reaction zone. The reaction gases and liquid are then taken from the second reaction zone and the acetylene and vinyl chloride are separated. If desired, the liquid may then be recycled to the first reaction zone for further use.

According to the invention, the reaction is carried out in a reactor that is bounded on the inside by the flowing liquid and into which oxygen or an oxygen-containing gas is introduced. The oxygen content is at most 5% based on the total quantity of gas introduced.

The flowing liquid keeps the reactor walls cool and fully protects them from corrosive gases. Deposition of soot and tarry products on the reactor walls is substantially eliminated by the flowing liquid; therefore, the reactor may be constructed with an inexpensive grade of steel. Due to the presence of the cooling layer on the inside, it is also possible to employ glass or ceramic material in the reactor.

The addition of oxygen serves to stabilize the flame. The oxygen or oxygen-containing gas is preferably added to the reactor separately and forms a relatively small flame at the reactor inlet with a stoichiometric quantity of hydrocarbon (based on oxygen) which is also supplied separately. The flame is preferably in the center of the reaction mixture introduced. The presence of this stabilizing flame enables the process to be caried out without difficulty at widely differing chlorine-to-methane ratios. In particular, the process may be carried out at relatively low chlorine-to-methane ratios. This is of importance in order to obtain the desired products. At a chlorine-to-methane volumetric ratio of 2:1 the reaction may proceed as follows:

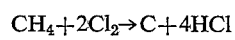

However, if the volumetric ratio is 1.5:1, the reaction may proceed as follows:

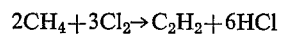

In the latter reaction the stoichiometric equilibrium does not allow the formation of carbon; moreover, less hydrogen chloride is produced per mole of methane. In general, it is desirable to choose a low chlorine-to-methane ratio. The process can be operated smoothly at a chlorine-to-methane ratio of 0.5:1.

Another advantage of the presence of a stabilizing flame is the convenient and gradual method by which the process can be started. If the inlet ducts for the gases to the stabilizing flame are located in a detachable reactor head, the oxygen may be ignited with the head removed. After the head has been fitted to the reactor, the hydrocarbon supply may be opened and adjusted to the desired flow after which the chlorine supply may be gradually started. When operated in this manner, the process starts automatically without any bumps. It is also possible, if desired, to ignite the oxygen flame in the reactor with an insertable igniter.

It is already known that the cooling of the gases formed in the reaction by the injection of water reduces the formation of soot. The extent to which this measure leads to the desired object depends on the rate at which the gases are cooled. The most effective method is found to be in the quenching of the flame. One of the major advantages of this invention is that it is particularly adapted to bring about the desired quenching. This is accomplished by passing the liquid flowing along the reactor walls in the first reaction zone through a constriction thereby atomizing the liquid and cooling the gases. For obvious reasons the reactor is preferably tubular and assumes the form of a Venturi tube by the constriction applied. The position of the constriction and the extent to which the tube is constricted depend entirely on the quantities of gas and liquid supplied. It is preferable to choose the dimensions of the first reaction zone such that the residence time of the gas in that zone is within the range of 0.001 to 0.01 second.

The present invention is useful for the preparation of both acetylene and vinyl chloride. These products are suitable intermediates in the chemical industry and are usually obtained from hydrocarbons that are unsuitable in themselves, for processing in the chemical industry. In particular, the present process is of importance for the processing of natural gas having a high methane content.

A distinct advantage of the present invention is the flexibility of the process. For example, the ratio of acetylene to vinyl chloride may be varied depending upon which product is most desired. Also, for economic reasons, the process conditions should be chosen that reduce the discharge of hydrogen chloride and the formation of soot and tarry products to a minimum.

In a reactor with a constriction, the process is considered to progress in two steps. In the first reaction zone ahead of the constriction, acetylene is formed and reaction with chlorine takes place forming a mixture of acetylene, vinyl chloride and hydrogen chloride. In the second reaction zone beyond the constriction acetylene and hydrogen chloride react to form additional vinyl chloride. The residence time of the gases in the second reaction zone is preferably between 0.1 and 10 seconds and the temperature is within the range of 200–500° C. By using this mode of operation the quantity of hydrogen chloride discharged is reduced and the content of vinyl chloride raised.

The use of a reactor with liquid flowing along the inner walls also enhances possibilities of influencing the ratio of acetylene to vinyl chloride in the product. If the liquid is water, hydrogen chloride will be dissolved in it, resulting in weakly chlorinated hydrocarbons and producing a high acetylene content. If little or no hydrogen chloride is dissolved in the liquid, the gas in the reactor will contain more hydrogen chloride thereby promoting the formation of vinyl chloride. It is therefore possible to vary the composition of the product gas by selecting a liquid with a predetermined solubility for hydrogen chloride. Since it is generally desirable to discharge a minimum quantity of hydrogen chloride it is advantageous to select a flowing liquid in which hydrogen chloride is substantially insoluble. Exemplary of liquids suitable for this purpose are concentrated solutions of one or more salts in water. For example a concentrated alkali metal, e.g., sodium sulfate solution is very suitable. A molten salt or mixtures of molten salts can also be advantageously employed.

Additional reduction of the quantity of hydrogen chloride discharged from the reaction zones can be obtained by employing a flowing liquid that has a catalytic action toward the conversion of acetylene into vinyl chloride.

For example, U.S. Patent 3,113,158 issued to Jacobowsky, Dec. 3, 1963 and Sundermeyer et al., Chemische Berichte 95 (1962) 1829–1831 both teach processes for the preparation of vinyl chloride from acetylene and hydrogen chloride using mercuric chloride as a catalytically active substance. Mercuric chloride has also been found to be an effective catalyst for the preparation of vinyl chloride utilizing chlorine and methane as starting materials according to the present invention. Because of the presence of oxygen, the reaction mixture contains minor amounts of carbon monoxide, water and carbon dioxide which do not adversely affect the catalytic action. A mixture of potassium chloride, zinc chloride and mercuric chloride in the molten state is particularly active. The content of mercuric chloride is preferably about 5% by weight of the total weight of the salt used.

The liquid used in the process may be recycled, if desired, for further use. This is economically desirable, particularly, when using concentrated salt solutions or molten salts. Known methods for cooling, removal of solid particles and pumping can be applied to the salt recycle if desired.

In order to ensure adequate cooling and to prevent dry spots the rate at which the liquid is run along the reactor wall should be adjustable. At high gas rates there is danger of the wall being blown dry locally and the liquid rate must be above a certain minimum value to prevent this from happening. Care must be exercised, however, since at very high liquid rates the constriction in the reactor, if one is present, would be completely filled. Subsequently, when the opening is blown open again by the reaction gases there arise fluctuations in the gas flow which impair the stability of the flame. It is possible, however, to choose such a combination of gas rate and diameter of the constriction that the liquid layer remains continuous and that a suitable quantity of liquid is atomized in the constriction for the extinction of the flame without periodic plugging of the constriction with liquid.

The separation of the gas and liquid streams at the reactor outlet can be accomplished by any conventional means for such separations. For example, a settling phase or a bend separator may be used.

A preferred method of operating the present invention is best described in reference to the accompanying drawing.

The reactor consists of a tube 1 having burner head 2 mounted in the top. Through this head, shown in detail in FIG. 2 the reaction mixture and oxygen are supplied. The flame reaction takes place in reaction zone 3. The liquid used is fed into the system at entrance 4 and passes over guide face 5 which forms a liquid film 6 on the inside of the reactor walls. The combustion gases and liquid pass downwardly to the constriction 7 separating the reaction zones. A portion of the liquid is atomized by the combustion gases passing through constriction 7 and the flame is extinguished at that point. The liquid film 6 continues throughout second reaction zone 8 which contains the cooled gases passing through construction 7 and in which further reactions between acetylene and hydrogen chloride take place. The reaction gases and liquid are withdrawn from the bottom of reaction zone 8 and separated by conventional means not shown. The liquid may then be recycled and enter tube 1 through entrance 4.

FIG. 2 shows a burner head suitable for use in the design of FIG. 1. Oxygen is supplied in burner head 2 through inlet 9 and an appropriate quantity of hydrocarbon to be mixed with oxygen to supply the stabilizing flame is fed in through inlet 10. The methane to be converted enters the system through line 11 and the chlorine through line 12. At the end of the burner 13 which is located in the top of reaction zone 3 in FIG. 1, the stabilizing flame develops in the center. About this flame, a glowing mass of gas to be converted is formed.

EXAMPLE

The following runs were carried out in a Pyrex glass reactor of the Venturi type having a total length of 25 cm., a diameter of 3.5 cm. and which contained a constriction 11 cm. from the top which construction had a diameter of 0.9 cm. Methane gas was introduced into the top of the reactor at a rate of 3000 liters/hour and chlorine was supplied at the rate of 4050 liters/hour. Oxygen was added at the rate of 325 liters/hour and the associated methane stream was fed in at the rate of 175 liters/hour. The liquid was added at the rate of 625 liters/hour.

The methane gas used in these runs had the following composition: 92.7% methane, 3.7% nitrogen and 3.6% balance (carbon dioxide, ethane, etc.) The percentages are expressed as percent by volume.

The tabulation below shows the results of runs conducted under conditions as specified above and in which the liquid along the inner wall of the reactor consisted of (1) water, (2) an aqueous solution of sodium sulfate saturated at room temperature, and (3) a salt melt comprising 30% potassium chloride, 65% zinc chloride and 5% mercuric chloride. Percentages are expressed as percent by weight.

| Liquid | $H_2O$ | $H_2O + Na_2SO_4$ | Molten Salt |
|---|---|---|---|
| Chlorine/methane ratio | 1.35 | 1.35 | 1.35 |
| Percent $CH_4$ converted to $C_2H_2$ | 47.2 | 38.4 | 30.0 |
| Percent $CH_4$ converted to $C_2H_4$ | 3.1 | 4.0 | 3.1 |
| Percent $CH_4$ converted to $CH_3Cl$ | 1.9 | 4.5 | 1.9 |
| Percent $CH_4$ converted to $C_2H_3Cl$ | 2.4 | 10.6 | 14.0 |
| Percent $CH_4$ converted to carbon | 13.4 | 7.0 | |
| Total methane converted, percent | 82.7 | 77.0 | 82.7 |
| Selectivity to $C_2H_2$, percent | 57.1 | 50.3 | 36.3 |
| Selectivity to $C_2H_3Cl$, percent | 2.9 | 13.8 | 16.9 |

Selectivity is defined as the percentage of methane converted into the desired product divided by the percentage of total methane converted.

These runs clearly show the increase in the conversion of methane into vinyl chloride and the simultaneous decrease in the conversion of methane into acetylene by replacing water with a salt solution or a salt melt as a liquid coating to the reactor.

We claim as our invention:

1. In a process for the preparation of acetylene and vinyl chloride by the flame reaction of methane and chlorine the improvement which comprises maintaining a stabilizing flame of oxygen and hydrocarbon gas in a first reaction zone into which methane and chlorine are fed while constantly flowing a liquid selected from the group consisting of saturated aqueous alkali metal sulfate solutions and molten mixtures consisting essentially of potassium chloride, zinc chloride and mercury chloride along the inside walls of said reaction zone, passing the resulting gaseous product stream along with said liquid flowing along the inside walls of said first reaction zone through a zone of constricted cross-section separating the first reaction zone from a second reaction zone thereby causing a portion of said liquid to be atomized into the gaseous stream passing through said constricted zone and cooling said gases and extinguishing the flame, passing said cooled gases and atomized liquid through the second reaction zone bounded by walls having the inner surface thereof coated with a liquid layer of the unatomized liquid flowing through said constricted zone whereby further reaction takes place, passing the gaseous products and liquid from said second reaction zone and separating the acetylene and vinyl chloride thus formed.

2. A process according to claim 1 wherein the oxygen and hydrocarbon gases forming the stabilizing flame are supplied separately and form a small flame at the reactor inlet in the center of the reaction mixture of methane and chlorine.

3. A process according to claim 2 wherein the residence time of the gas in the first reaction zone ranges from 0.001 to 0.01 second.

4. A process according to claim 3 wherein the residence time of the gas in the second reaction zone is within the range of 0.1 to 10 seconds and the temperature in the second reaction zone is within the range of 200 to 500° C.

5. In a process for the preparation of vinyl chloride by the flame reaction of methane and chlorine, the improvement which comprises maintaining a stabilizing flame of oxygen and hydrocarbon gas in a first reaction zone into which the methane and chlorine are fed while constantly flowing a liquid selected from the group consisting of a saturated solution of sodium sulfate in water and a molten potassium chloride, zinc chloride and mercuric chloride mixture along the inside walls of said first reaction zone, to form a gaseous mixture comprising acetylene, vinyl chloride and hydrogen chloride, passing said gaseous mixture along with the flowing liquid through a zone of constricted cross-section separating the first reaction zone from a second reaction zone thereby causing a portion of said flowing liquid to be atomized into the gaseous mixture passing through said constricted zone and cooling said gaseous mixture and extinguishing the flame, passing said gaseous mixture and atomized liquid through the second reaction zone bounded by walls having the inner surface thereof coated with a layer of unatomized liquid passing through said constricted zone whereby further reaction takes place between acetylene and hydrogen chloride to form vinyl chloride, passing the gaseous reaction products and flowing liquid from said second reaction zone and separating the vinyl chloride therefrom.

6. In a process for the preparation of acetylene and vinyl chloride by the flame reaction of methane and chlorine the improvement which comprises maintaining a stabilizing flame of oxygen and hydrocarbon gas in a first reaction zone into which methane and chlorine are fed while constantly flowing a liquid consisting essentially of a saturated solution of sodium sulfate in water along the inside walls of said first reaction zone, maintaining a residence time of from 0.001 to 0.01 second in said first reaction zone, passing the resulting gaseous product stream along with said liquid flowing along the inside walls of said first reaction zone through a zone of constricted cross-section separating the first reaction zone from a second reaction zone thereby causing a portion of said liquid to be atomized into the gaseous stream passing through said constricted zone and cooling said gases and extinguishing the flame, passing said cooled gases and atomized liquid through the second reaction zone bounded by walls having the inner surface thereof coated with a liquid layer of the unatomized liquid flowing through said constricted zone, maintaining a residence time of 0.1 to 10 seconds and a temperature of from 200 to 500° C. in said second reaction zone, whereby further reaction takes place, passing the gaseous products and liquid from said second reaction zone and separating the acetylene and vinyl chloride thus formed.

7. In a process for the preparation of acetylene and vinyl chloride by the flame reaction of methane and chlorine the improvement which comprises maintaining a stabilizing flame of oxygen and hydrocarbon gas in a first reaction zone into which methane and chlorine are fed while constantly flowing a liquid consisting essentially of a molten mixture of potassium chloride, zinc chloride and mercuric chloride along the inside walls of said first reaction zone, maintaining a residence time of from 0.001 to 0.01 second in said first reaction zone, passing the resulting gaseous product stream along with said liquid flowing along the inside walls of said first reaction zone through a zone of constricted cross-section separating the first reaction zone from a second reaction zone thereby causing a portion of said liquid to be atomized into the gaseous stream passing through said constricted zone and cooling said gases and extinguishing the flame, passing said cooled gases and atomized liquid through the second reaction zone bounded by walls having the inner surface thereof coated with a liquid layer of the unatomized liquid flowing through said constricted zone, maintaining a residence time of 0.1 to 10 seconds and a temperature of from 200 to 500° C. in said second reaction zone whereby further reaction takes place, passing the gaseous products and liquid from said second reaction zone and separating the acetylene and vinyl chloride thus formed.

References Cited

FOREIGN PATENTS 711,287   6/1965   Canada.

LEON ZITVER, *Primary Examiner.*

J. BOSKA, *Assistant Examiner.*